United States Patent [19]
Ozawa et al.

[11] Patent Number: 5,738,158
[45] Date of Patent: Apr. 14, 1998

[54] PNEUMATIC TIRE WITH AIR PERMEATION PREVENTION LAYER

[75] Inventors: Osamu Ozawa; Noriaki Kuroda; Jiro Watanabe; Masahiro Ikawa; Tetsuji Kawazura, all of Hiratsuka, Japan

[73] Assignee: The Yokohama Rubber Co., Ltd., Tokyo, Japan

[21] Appl. No.: 590,894

[22] Filed: Jan. 24, 1996

[30] Foreign Application Priority Data

Jan. 25, 1995 [JP] Japan ................................. 7-009850
Mar. 15, 1995 [JP] Japan ................................. 7-055930

[51] Int. Cl.⁶ .................................................... B60C 5/14
[52] U.S. Cl. ............................... 152/510; 152/DIG. 16
[58] Field of Search ........................... 152/510, 511, 152/512, 504, DIG. 16

[56] References Cited

U.S. PATENT DOCUMENTS

| | | | |
|---|---|---|---|
| 3,888,291 | 6/1975 | Herzlich et al. | 152/209 R |
| 5,040,583 | 8/1991 | Lin et al. | 152/510 |
| 5,443,104 | 8/1995 | Dollinger et al. | 152/DIG. 16 |

FOREIGN PATENT DOCUMENTS

| | | |
|---|---|---|
| 47-31761 B | 8/1972 | Japan . |
| 5-25374 A | 2/1993 | Japan . |
| 5-318618 A | 12/1993 | Japan . |
| 5-330307 A | 12/1993 | Japan . |
| 6-40207 A | 2/1994 | Japan . |

OTHER PUBLICATIONS

Kirk–Othmer, Encyclopedia of Chemical Technology, 4th ed., vol. 9, pp. 15–37, Feb. 1994.

C. M. Blow, ed., Rubber Technology and Manufacture, pp. 33–36, Jan. 1972.

Primary Examiner—Geoffrey L. Knable
Attorney, Agent, or Firm—Finnegan, Henderson, Farabow, Garrett & Dunner

[57] ABSTRACT

A pneumatic tire having an air permeation prevention layer composed of a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/polyoxyalkylene diimide diacid of 85/15 or less.

10 Claims, 1 Drawing Sheet

PNEUMATIC TIRE WITH AIR PERMEATION PREVENTION LAYER

BACKGROUND OF THE INVENTION

1. Field of the Invention

The present invention relates to a pneumatic tire having an air permeation prevention layer superior in the balance between resistance to air permeation and flexibility. More specifically, it relates to a pneumatic tire using an air permeation prevention layer which enables the air permeation prevention layer such as an inner liner layer to be made thinner and the weight of the tire to be reduced without impairing the capability of retaining the air pressure of the pneumatic tire.

2. Description of the Related Art

The reduction of fuel consumption is one of the major technical problems to be solved in the automobile industry. There have been increasingly stronger demands for reduction of the weight of the pneumatic tires as part of this approach.

The inner surface of a pneumatic tire is provided with an inner liner layer composed of a low gas permeable rubber such as butyl rubber so as to enable the tire air pressure to be kept constant. However, a halogenated rubber suffers from a large hysteresis loss. For this reason, when, after vulcanization of the tire, there are waves formed in the inner surface rubber of the carcass layer and the inner liner layer in the space between the carcass cords and the inner liner rubber layer deforms along with the deformation of the carcass layer, there is the problem that the rolling resistance increases. Therefore, in general, the inner liner layer (i.e., halogenated butyl rubber) and inner surface rubber of the carcass layer are joined through a rubber sheet, which is called a tie gum having a small hysteresis loss. Accordingly, in addition to the thickness of the inner liner layer of the halogenated butyl rubber, there is added the thickness of the tie gum and the layer as a whole becomes a thickness of over 1 mm (i.e., 1000 μm). As a result, this becomes one factor increasing the weight of the final tire product.

Various proposals have been made for using various materials, in place of the low gas permeable rubber such as butyl rubber, as the inner liner layer of the pneumatic tire. For example, Japanese Examined Patent Publication (Kokoku) No. 47-31761 discloses the coating of the inner surface of a vulcanized tire having a thickness of 0.1 mm or less from a solution or dispersion of a synthetic resin such as polyvinylidene chloride, saturated polyester resin, or a polyamide resin having an air permeation coefficient (cm$^3$ (normal condition)/cm•sec•mmHg)) of $10\times10^{-13}$ or less at 30° C. and of $50\times10^{-13}$ or less at 70° C.

The technique disclosed in this publication is to provide the inner surface of the carcass or the inner surface of the inner liner of a vulcanized tire with a coating of a synthetic resin having a specific air permeation coefficient and making the thickness of the synthetic resin coating of 0.1 mm or less, but the pneumatic tire described in the publication had a problem in the bonding between the rubber and synthetic resin and further had a defect of an inner liner layer inferior in flexibility, heat resistance, and moisture resistance (or water resistance).

Japanese Unexamined Patent Publication (Kokai) No. 5-330307 discloses to halogenate the inner surface of the tire (using a conventionally known chlorination solution, bromine solution, or iodine solution) and form on top of that a polymer coating (thickness of 10 to 200 μm) of methoxymethylated nylon, copolymer nylon, a blend of polyurethane and polyvinylidene chloride, or a blend of polyurethane and polyvinylidene fluoride.

Further, Japanese Unexamined Patent Publication (Kokai) No. 5-318618 discloses a pneumatic tire having a thin film of methoxymethylated nylon as an inner liner. According to this technique, the inner surface of a green tire is sprayed or coated with a solution or emulsion of methoxymethylated nylon, then the tire is vulcanized or alternatively the inner surface of a vulcanized tire is sprayed or coated with a solution or emulsion of methoxymethylated nylon so as to produce a pneumatic tire. Even in the art disclosed in these publications, however, the water resistance of the thin films are poor and a sufficient resistance to air permeation cannot be obtained. In addition, there is the defect that it is difficult to maintain uniformity in film thickness. Japanese Unexamined Patent Publication (Kokai) No. 6-40207 discloses an example of use of a multilayer film having a low air permeation layer composed of a polyvinylidene chloride film or ethylene-vinyl alcohol copolymer film and a bonding layer comprised of a polyolefin film, aliphatic polyamide film, or polyurethane film as the air permeation prevention layer of the tire. However, in this system, the low air permeation layer lacks flexibility and the film is unable to keep up with expansion and contraction during the use of the tire and therefore cracks.

As explained above, various materials have been proposed for the air permeation prevention layer of an pneumatic tire, in place of butyl rubber, but none have yet been commercialized. In particular, no material has yet been developed superior in the balance of the resistance to air permeation and flexibility required as an air permeation prevention layer of a pneumatic tire.

SUMMARY OF THE INVENTION

Accordingly, the object of the present invention is to provide a pneumatic tire comprising an air permeation prevention layer of a thin film superior in the balance of the resistance to air permeation and flexibility and enabling the reduction of the weight of the tire, without impairing capability of retaining air pressure of the pneumatic tire.

In accordance with the present invention, there is provided a pneumatic tire having an air permeation prevention layer composed of a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/polyoxyalkylene diimide diacid of 85/15 or less.

In accordance with the present invention, there is also provided a pneumatic tire having an air permeation prevention layer composed of a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/polyoxyalkylene diimide diacid of 90/10 or less, wherein rubber particles are further dispersed in the thermoplastic polyester elastomer and wherein, the amount of the rubber particles are 75% by weight or less of the total resin composition.

BRIEF DESCRIPTION OF THE DRAWINGS

The present invention will be better understood from the description set forth below with reference to the accompanying drawing of FIG. 1, which is a semi-cross-sectional view along the meridian direction showing the structure of an inner liner part of a pneumatic tire according to the present invention.

DESCRIPTION OF THE PREFERRED EMBODIMENTS

Figure 1:
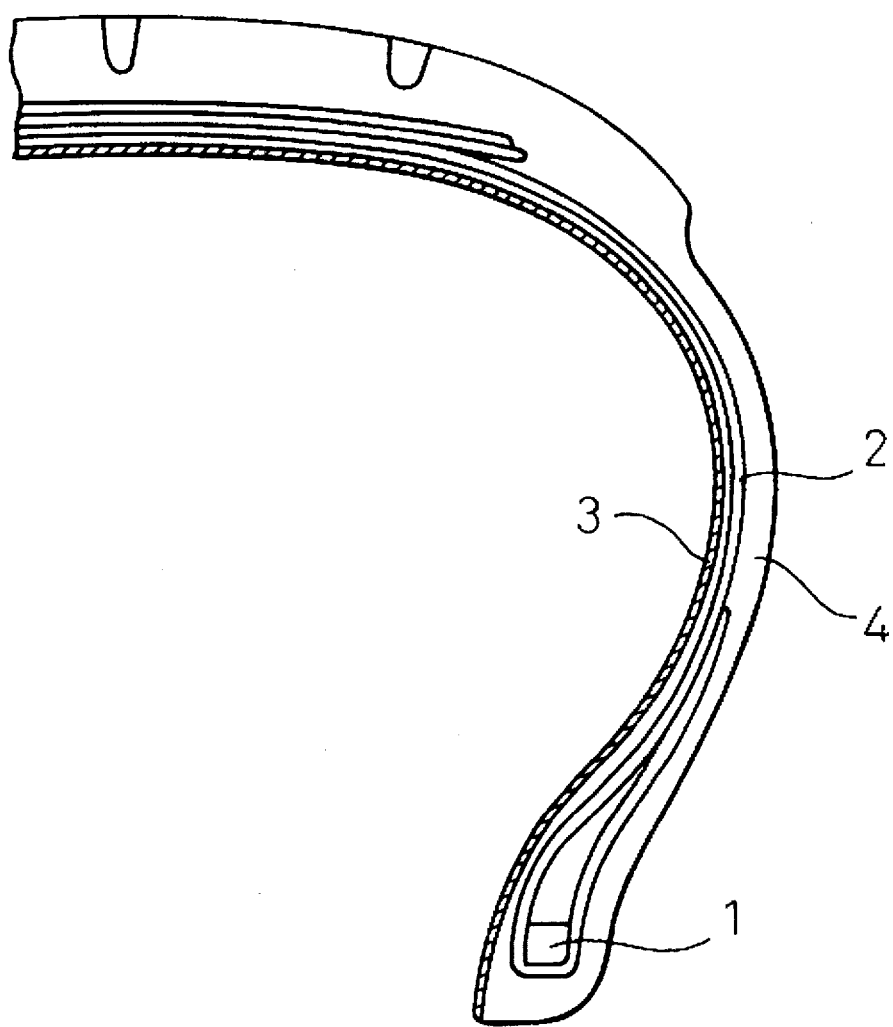

The thin film of the air permeation prevention layer according to the present invention has an air permeation coefficient of $25 \times 10^{-12}$ cc·cm/cm$^2$·s·cmHg (at 30° C.) or less, preferably $5 \times 10^{-12}$ cc·cm/cm$^2$·s·cmHg (at 30° C.) or less, and a Young's modulus of 1 to 500 MPa, preferably 10 to 300 MPa.

The thermoplastic polyester elastomers usable in the present invention include block copolymers of polybutylene terephthalate (PBT) and polyoxyalkylene diimide diacid. The ratio of composition by weight of the polybutylene terephthalate and the polyoxyalkylene diimide diacid is 85/15 or less, preferably 45/55 to 85/15, more preferably 70/30 to 85/15. When the ratio of composition by weight exceeds 85/15, the Young's modulus of the resin composition becomes too large, and therefore, the riding comfort given by the resultant tire ends up becoming poor. The thermoplastic polyester elastomer may be produced according to a general process for producing a polyester by reacting a diol and an acid.

The PBT usable for the production of the above-mentioned thermoplastic polyester elastomer is a copolymer of 1,4-butanediol and dimethyl terephthalate and has an average molecular weight of 300 to 5000, preferably 500 to 2000.

The polyoxyalkylene diimide diacid usable in the production of the above-mentioned thermoplastic polyester elastomer is a diacid of a polymer having an average molecular weight greater than 700, preferably greater than 900. These diacids may be produced by the imidization of mellitic acid trianhydride with a high molecular weight polyoxyalkylene diamine.

The polyoxyalkylene diamine usable in the production of the above-mentioned polyoxyalkylene diimide diacid is produced from a long chain ether glycol. Typical long chain ether glycols are poly(ethylene ether) glycol, poly(propylene ether) glycol, poly(tetramethylene ether) glycol, polyethylene oxide, and propylene oxide random or block copolymers. A polyoxyalkylene diamine is produced by polymerizing acrylonitrile with the above-mentioned long chain ether glycols, followed by reducing the nitrile groups of the polymer.

The thermoplastic polyester elastomer is commercially sold under the tradename LOMOD (GE Plastics Co.)

The amount of formulation of the thermoplastic polyester elastomer usable in the present invention is at least 20% by weight, preferably at least 50% by weight, of the total resin composition. When the amount is less than 20% by weight, the resistance to air permeation of the resin composition is decreased and the film can no longer function as an air permeation prevention layer of the tire.

Examples of blending agents other than the thermoplastic polyester elastomer included in the resin composition of the present invention, are reinforcements, fillers, softening agents, plasticizers, antidegradants, processing adjuvants, and other conventional blending agents usually used for elastomers. These may be suitably added in amounts of less than 80% by weight of the resin composition.

The air permeation prevention layer of the pneumatic tire according to the present invention may also be comprised from a thin film in which rubber particles are dispersed in the above-mentioned thermoplastic polyester elastomer and which satisfies the above-mentioned air permeation rate and Young's modulus. Examples of such rubber particles, diene rubbers and their hydrogenates (e.g., NR, IR, epoxylated natural rubber, SBR, BR (high cis BR and low cis BR), NBR, hydrogenated NBR, hydrogenated SBR), olefin rubbers (for example, ethylene propylene rubber (EPDM, EPM), maleic acid modified ethylene propylene rubber (M-EPM), IIR, isobutylene and aromatic vinyl or diene monomer copolymers, acryl rubber (ACM), ionomers), halogen-containing rubbers (for example, brominated butyl rubber (Br-IIR), chlorinated butyl rubber (Cl-IIR), brominated isobutylene paramethylstyrene copolymers (Br-IPMS), chloroprene rubber (CR), hydrin rubber (CHR, CHC), chlorosulfonated polyethylene (CSM), chorinated polyethylene (CM), maleic acid modified chlorinated polyethylene (M-CM)), silicone rubber (for example, methylvinyl silicone rubber, dimethyl silicone rubber, methyl phenylvinyl silicone rubber), sulfur-containing rubbers (for example, polysulfide rubber), fluororubbers (for example, vinylidene fluoride rubber, fluorine-containing vinyl ether rubber, tetrafluoroethylene propylene rubbers, fluorine-containing silicone rubbers, fluorine-containing phosphazen rubber), thermoplastic elastomers (for example, styrene elastomers, polyolefin elastomers, polyester elastomers, polyurethane elastomers, polyamide elastomers), etc.

The rubber particles may be rubber alone or rubber compositions including reinforcements, fillers, softening agents, antidegradants, processing aids, etc. Further, the rubber particles may be dispersed in the thermoplastic elastomer in the unvulcanized state or may be dispersed in the state vulcanized by so-called dynamic vulcanization of vulcanizing the resin composition and rubber composition while adding a cross-linking agent (vulcanization agent) into the mixture.

Further, the ratio of composition by weight of the polybutylene terephthalate/polyoxyalkylene diimide diacid of the thermoplastic polyester elastomer for dispersion of the rubber particles is 90/10 or less, preferably 45/55 to 90/10, more preferably 70/30 to 90/10. This ratio of composition by weight is larger than those not including rubber particles, but this is because even with this ratio of composition, dispersion of rubber particles decreases the Young's modulus and makes it possible to satisfy the Young's modulus, that is, 1 to 500 MPa, and the air permeation coefficient, that is, $25 \times 10^{-12}$ cc·cm/cm$^2$·sec·cmHg or less at 30° C., usable for a tire material.

The method for dispersing the rubber particles into the thermoplastic polyester elastomer is not particularly limited, but, for example, the method of using a screw extruder, kneader, Bambury mixer, bi-axial kneader and extruder, etc. to knead and disperse the particles may be used. In particular, when dynamically vulcanizing the rubber component, a bi-axial kneader and extruder where a large shear rate can be obtained is preferably used. The condition for melt kneading is a temperature of at least the temperature where the thermoplastic resin melts. Further, a shear rate at the time of kneading of 2500 to 7500/sec is preferable. The overall kneading time is from 30 seconds to 10 minutes. Further, when a vulcanization agent is added, the vulcanication time after the addition is preferably 15 seconds to 5 minutes.

Among the various blending agents added in the resin composition of the present invention, the vulcanization agent is added in the state where the thermoplastic polyester elastomer and the rubber have been fully kneaded to cause dynamic vulcanization of the rubber. The other blending agents may be added during the kneading, but it is rather preferable that they be premixed in.

When the compatibilities of the thermoplastic polyester elastomer and the rubber are different, it is preferable to make the two soluble with each other by using a suitable compatibilizer as a third component. Mixing of a compatibilizer into the system enables the surface tension of the thermoplastic polyester elastomer component and the rubber to be lowered and as a result, makes the rubber particles forming the dispersion layer smaller in size, and therefore the characteristics of the two components are more effectively brought out. Examples of such a compatibilizer are a copolymer having the structure of one or both of the thermoplastic polyester elastomer component and rubber component or one having the structure of a copolymer having a group reactable with the thermoplastic polyester elastomer component or rubber component such as an epoxy group, carbonyl group, halogen group, amine group, oxazoline group, hydroxyl group, etc. These may be selected according to the type of the thermoplastic polyester elastomer component or rubber component to be blended. However, normally SEBS and its maleic modified SEBS, 1,2-polybutadiene rubber and maleic modified 1,2-polybutadion rubber, ethylene methylacrylate resin (EMA), ethylene ethylacrylate resin (EEA), and other acrylate resins, EPDM and its maleic modified EPDM, EPDM/styrene or EPDM/acrylonitrile graft copolymers and their maleic modified copolymer, styrene/maleic acid copolymers, reactive phenoxy resins, etc. are used. The amount of the compatibilizer is not particularly limited, but preferably is 0.5 to 10 parts by weight based on 100 parts of the polymer component (i.e., total of thermoplastic polyester elastomer and rubber).

The polymer composition produced by the above-mentioned method preferably and feasibly has a dispersed structure in which the rubber layer serves as the domain (dispersing phase) and the resin layer as the matrix. Further, vulcanization by dynamic vulcanization is most preferred. By adopting a dispersed structure of this state, it is possible to impart a balance of flexibility and resistance to air permeation and to obtain effects such as resistance to heat deformation and, further, is capable of processing thermoplastic and therefore, film formation by the ordinary resin molding machines, that is, extrusion, calendering, etc. becomes possible. The method of film formation may be the method of forming a film from an ordinary thermoplastic resin or thermoplastic elastomer.

The amount of the rubber particles dispersed in the thermoplastic polyester elastomer may be up to 75% by weight, preferably 10 to 50% by weight, based on the total weight of the resin composition depending upon the thickness of the film and the balance of the resistance to air permeation and flexibility. When more than 75% by weight, the resistance to air permeation of the resin composition is decreased and the film does not function as a desired air permeation prevention layer of the tire. Further, the average particle size of the rubber particles in the dispersed state is preferably 0.5 to 20 µm, more preferably 1 to 10 µm.

The adhesion between the film and the rubber layer facing thereto is performed using an ordinary chlorinated rubber based, phenolic resin based, or isocyanate based adhesive under the conditions of the heat and pressure at the time of vulcanization and molding. These adhesives include, for example, phenol resin based adhesives (Chemlock 220), chlorinated rubber based adhesives (Chemlock 205), and isocyanate based adhesives (Chemlock 402).

The present invention having the air permeation prevention layer according to the present invention will now be explained in further detail.

The air permeation prevention layer of the pneumatic tire according to the present invention may be arranged at any location inside the tire, that is, at the inside or outside of the carcass layer or at any other location. The point is that it should be arranged so as to prevent the permeation and dispersion of air from the inside of the tire and is capable of keeping the air pressure inside the tire for a long period of time, whereby the object of the invention can be achieved.

FIG. 1 is a semi-cross-sectional view along the meridian direction illustrating a typical example of the arrangement of an air permeation prevention layer of a pneumatic tire according to the present invention. In FIG. 1, a carcass layer 2 spans between the left and right bead cores 1 and 1. On the tire inner surface at the inside of the carcass layer 2 is provided an inner liner layer 3. The inner liner layer 3 is composed by the above-mentioned resin composition in the present invention. In FIG. 1, 4 shows a sidewall.

Regarding the process of production of a pneumatic tire having an air permeation prevention layer comprised of a thin film of a resin composition according to the present invention, as shown in FIG. 1, explaining the example of the case of arranging the inner liner layer 3 at the inside of the carcass layer 2, the polymer composition of the present invention is extruded to a thin film of a predetermined width and thickness by a resin extruder, then this is wrapped around a tire forming drum and joined to make cylindrical shape. On the top thereof are then successively superposed a carcass layer comprised of unvulcanized rubber, a belt layer, a tread layer, and other members used for the production of usual tires, then the drum is withdrawn to obtain a green tire. Thereafter, this green tire is heated and vulcanized according to an ordinary method to make a desired light weight pneumatic tire. Note that the same type of process may be followed even when providing the air permeation prevention layer on the outer circumference of the carcass layer.

The material of the rubber layer for lamination of the air permeation prevention layer according to the present invention is not particularly limited. Any rubber material which has been generally used as a rubber material for a tire in the past may be used. Examples of such a rubber are rubber compositions comprised of diene rubbers such as NR, IR, BR, and SBR, halogenated butyl rubbers, ethylene-propylene copolymer rubbers, styrenic elastomers, etc. to which have been added blending agents such as carbon black, process oil, and vulcanization agents.

The air permeation prevention layer according to the present invention, as explained above, has an air permeation coefficient of $25 \times 10^{-12}$ cc·cm/cm$^2$·sec·cmHg (at 30° C.) or less, preferably $5 \times 10^{-12}$ cc·cm/cm$^2$·sec·cmHg (at 30° C.) or less. By making the air permeation coefficient of $25 \times 10^{-12}$ cc·cm/cm$^2$·sec·cmHg (at 30° C.) or less, it is possible to make the thickness of the air permeation prevention layer of ½ or less of the thickness of the conventional air permeation prevention layer.

On the other hand, the Young's modulus is 1 to 500 MPa, preferably 10 to 300 MPa, and the thickness is 0.02 to 1.0 mm, preferably 0.05 to 0.5 mm. When the Young's modulus is less than 1 MPa, then wrinkles will form at the time of forming the tire, whereby the handling will become difficult. Contrary to this, when the Young's modulus is more than 500 MPa, it is not possible for the film to follow the deformation of the tire during use.

EXAMPLES

The present invention will now be explained in further detail with reference to the Examples, but, the present invention is not limited to these Examples. The methods for evaluation used in the following Examples are shown below. The brands of the materials used in the Examples and the Comparative Examples are shown in Table I.

TABLE I

Brands of Various Blending Agents

| Substance | Brandname | Manufacturer |
|---|---|---|
| ACM | AR31 | Nippon Zeon |
| Br-IPMS | EXXPRO90-10 | Exxon Chemical |
| EPDM | Mitsui EPT3070 | Mitsui Petrochemical Industries |
| CHR | HERCLOR C | Hercules |
| SBR | Nipol 1502 | Nippon Zeon |
| Br-IIR | Exxon Bromobutyl 2244 | Exxon Chemical |
| Tetracarboxylic acid | Butanetetracarboxylic Acid Z | Daicel Chemical Industries |
| 1,4-butanediol | 14BG | Mitsubishi Kasei |
| Dimethyl terephthalate | Dimethyl terephthalate Reagent | Mitsubishi Kasei |
| Tetraoctyl titanate | | |
| Polypropylene diamine | Jeffarmin D2000 | Texaco |
| Anhydrous trimellitic acid | TMA | Mitsubishi Gas Chemical |
| ZnO | Zinc White No. 3 | Seido Chemical Industry |
| MgO | Kyowa Mag 150 | Kyowa Chemical Industry |
| Sulfur | Powdered sulfur | Karuizawa Seirensho |
| DM | Nocceler DM | Ouchi Shinko Chemical Ind. |
| TT | Nocceler TT | Ouchi Shinko Chemical Ind. |
| Zinc stearate | Zinc stearate | Seido Chemical Industry |
| Stearic acid | Bis-stearyl acid NY | Nippon Oil and Fat |
| Petroleum type hydrocarbon resin | ESCOREZ 1102 | Esso |
| Paraffinic process oil | Machine Oil 22 | Showa-Shell Sekiyu |
| GPF | Seast V | Tokai Carbon |
| HAF | Seast N | Tokai Carbon |

Method of Measurement of Air Permeation Coefficient of Film

According to JIS K7126 "Test Method of Gas Permeability of Plastic Films and Sheets (Method A)".

Test piece: Samples of films prepared in the examples used.

Test gas: Air ($N_2:O_2=8:2$)

Test temperature: 30° C.

Method of Measurement of Young's Modulus of Film

According to JIS K6251 "Tensile Test Method of Vulcanized Rubber".

Test piece: The compositions prepared in the examples were punched into JIS No. 3 dumbbell shapes in parallel to the direction of flow of the resin during the extrusion of the films. A tangent was drawn to the curve of the initial strain area of the resultant stress-strain curve and the Young's modulus was found from the inclination of the tangent.

Tire Air Leakage Performance Test Method

A 165SR13 steel radial tire (rim 13×41/2-J) was used, allowed to stand at an initial pressure of 200 kPa under no-load conditions at room temperature 21° C. for 3 months, and measured as to pressure every four day interval.

When the measured pressure is Pt, the initial pressure is Po, and the number of days elapsed is t, the value $\alpha$ is found by recurrence of the function:

$$Pt/Po=\exp(-\alpha t)$$

The obtained $\alpha$ is used and t=30 substituted in the following formula to obtain $\beta$:

$$\beta=\{1-\exp(-\alpha t)\}\times 100$$

This value $\beta$ is considered the rate of reduction of pressure per month (%/month).

Examples 1 to 5 and Comparative Examples 1 and 2

(1) Preparation of Polybutylene Terephthalate 1,4-butanediol and dimethyl terephthalate were mixed in a ratio of weight of 2/3 and allowed to react at 180° C. At that time, tetraoctyl titanate was used as the catalyst. The reaction was stopped at the point of time when a stoichiometric amount of methanol was produced from the reaction to obtain polybutylene terephthalate.

(2) Preparation of Polypropylene Diimide Diacid

Polypropylene diamine and anhydrous trimellitic acid were reacted at ordinary temperature for 1.5 hours, then reacted at 100° C. for 3 hours under reduced pressure to prepare polypropylene diimide diacid.

(3) Preparation of Thermoplastic Polyester Elastomer

The above polybutylene terephthalate and polypropylene diimide diacid were mixed in the weight ratios of Table II and reacted at 250° C. to prepare thermoplastic polyester elastomers.

The thermoplastic polyester elastomers prepared by the above method were pelletized, then some were mixed with the additives in Table II and extruded into films using a kneader and extruder to form films of a width of 350 mm and a thickness of 0.1 mm. The air permeation coefficient and Young's modulus were measured.

TABLE II

| | | | | | | | | (Parts by weight) |
|---|---|---|---|---|---|---|---|---|
| | | Comp. Ex. 1 | Ex. 1 | Ex. 2 | Ex. 3 | Ex. 4 | Ex. 5 | Comp. Ex. 2 |
| Composition | Polybutylene terephthalate | 35 | 45 | 65 | 65 | 75 | 85 | 90 |
| | Polypropylene diimide diacid | 65 | 55 | 35 | 35 | 25 | 15 | 10 |
| | HAF | — | — | — | 5 | — | — | — |
| | Stearic acid | — | — | — | 1 | — | — | — |

TABLE II-continued

|  | Comp. Ex. 1 | Ex. 1 | Ex. 2 | Ex. 3 | Ex. 4 | Ex. 5 | (Parts by weight) Comp. Ex. 2 |
|---|---|---|---|---|---|---|---|
| Results Air permeation coefficient × $10^{-12}$ (cc · cm/cm² · s · cmHg) (at 30° C.) | 41.0 | 24.0 | 11.0 | 12.1 | 5.0 | 1.8 | 0.9 |
| Young's modulus (MPa) | 140 | 180 | 230 | 241 | 330 | 490 | 610 |

Examples 6 to 8 and Comparative Example 3

The thermoplastic polyester elastomer of Example 2 and Br-IIR were formed into pellets, mixed by a bi-axial kneader and extruder in the various blending ratios shown in Table III, then pelletized by a resin pelletizer. The pellets were used to prepare sheets of a width of 350 mm and a thickness of 0.1 mm using a resin extruder. The air permeation coefficient and the Young's modulus of the sheets obtained were measured. The results are shown in Table III.

TABLE III

|  |  | (parts by weight) | | | |
|---|---|---|---|---|---|
|  |  | Comp. Ex. 3 | Ex. 6 | Ex. 7 | Ex. 8 |
| Composition | Polybutylene terephthalate (65)/polypropylene diimide diacid (35) copolymer | 30 | 50 | 70 | 90 |
|  | Br-IIR | 70 | 50 | 30 | 10 |
| Results | Air permeation coefficient × $10^{-12}$ (cc · cm/cm² · s · cmHg) (at 30° C.) | 34 | 25 | 18 | 13 |
|  | Young's modulus (MPa) | 39 | 64 | 107 | 178 |

Examples 9 to 19 and Comparative
Examples 4 to 8

The thermoplastic polyester elastomer of Example 5 and the various rubbers and, in some cases, the various cross-linking agents and cross-linking adjuvants and other blending agents were kneaded in the blending ratios shown in Table IV and Table V by a bi-axial kneader and extruder, the mixtures were pelletized by a resin pelletizer, then the pellets were used to prepare sheets of a width of 350 mm and a thickness of 0.1 mm using a resin extruder. The air permeation coefficient and the Young's modulus of the sheets obtained were measured. The results are shown in Table IV and Table V.

TABLE IV

|  | Ex. 9 | Ex. 10 | Ex. 11 | Comp. Ex. 4 | Ex. 12 | Ex. 13 | Comp. Ex. 5 |
|---|---|---|---|---|---|---|---|
| Polybutylene terephthalate (85) and polypropylene diimide diacid (15) copolymer | 30 | 90 | 70 | 60 | 90 | 50 | 5 |
| Br-IIR | 70 | — | — | — | — | — | — |
| EPDM | — | 10 | 30 | 40 | — | — | — |
| CHR | — | — | — | — | 10 | 50 | 95 |
| ZnO | 0.35 | 0.05 | 0.15 | 0.2 | — | — | — |
| MgO | — | — | — | — | 0.5 | 2.5 | 4.7 |
| Stearic acid | 1.4 | 0.2 | 0.6 | 0.8 | — | — | — |
| Zinc stearate | 0.7 | 0.1 | 0.3 | 0.4 | 0.2 | 1 | 1.9 |
| TT | — | — | — | — | 0.1 | 0.5 | 0.95 |
| Air permeation coefficient × $10^{-12}$ (cc · cm/cm² · s · cmHg) (at 30° C.) | 21.0 | 3.8 | 16.7 | 35.1 | 2.4 | 7.3 | 26.1 |
| Young's modulus (MPa) | 44 | 346 | 172 | 121 | 275 | 27 | 2 |

TABLE V

|  | Ex. 14 | Ex. 15 | Comp. Ex. 6 | Ex. 16 | Ex. 17 | Comp. Ex. 7 | Ex. 18 | Ex. 19 | Comp. Ex. 8 |
|---|---|---|---|---|---|---|---|---|---|
| Polybutylene terephthalate (85) and polypropylene diimide diacid (15) copolymer | 90 | 70 | 60 | 90 | 80 | 60 | 90 | 30 | 10 |
| SBR | 10 | 30 | 40 | — | — | — | — | — | — |
| ACM | — | — | — | 10 | 20 | 40 | — | — | — |
| Br-IPMS | — | — | — | — | — | — | 10 | 70 | 90 |

TABLE V-continued

|  | Ex. 14 | Ex. 15 | Comp. Ex. 6 | Ex. 16 | Ex. 17 | Comp. Ex. 7 | Ex. 18 | Ex. 19 | Comp. Ex. 8 |
|---|---|---|---|---|---|---|---|---|---|
| ZnO | 0.3 | 0.9 | 1.2 | — | — | — | — | — | — |
| Stearic acid | 0.1 | 0.3 | 0.4 | — | — | — | — | — | — |
| Sulfur | 0.15 | 0.45 | 0.6 | — | — | — | — | — | — |
| DM | 0.05 | 0.15 | 0.2 | — | — | — | — | — | — |
| Tetracarboxylic acid | — | — | — | 0.16 | 0.32 | 0.64 | — | — | — |
| Air permeation coefficient × $10^{-12}$ (cc · cm/cm² · s · cmHg) (at 30° C.) | 3.79 | 16.84 | 35.47 | 4.18 | 9.68 | 52.08 | 2.55 | 20.75 | 41.71 |
| Young's modulus (MPa) | 342 | 168 | 118 | 349 | 249 | 127 | 344 | 43 | 21 |

Examples 20 to 22 and Comparative Example 9

Various blending agents were blended with the Br-IIR and Br-IPMS to prepare the master batches A and B in closed Bambury mixers. The blends of the master batches A and B are shown in Table VI. The master batches for the rubber compositions were pelletized using a rubber pellet former and used as starting materials for the kneading of the rubber compositions and thermoplastic elastomers at the bi-axial kneader and extruder.

TABLE VI

| | Blend of Master Batch | |
|---|---|---|
| | Master batch A | Master batch B |
| Br-IIR | 100 | — |
| Br-IPMS | — | 100 |
| GPF | 60 | 60 |
| Stearic acid | 1 | — |
| Petroleum-type hydrocarbon resin | 10 | — |
| Paraffinic process oil | 10 | 20 |

Using these pelletized master batches, the thermoplastic elastomers and rubber compositions were kneaded by a bi-axial kneader and extruder by the various blend ratios (parts by weight) shown in Table VII, then the kneaded compositions were pelletized using a resin pelletizer and the pellets used to make films of a width of 350 mm and a thickness of 0.15 mm by a resin extruder. The air permeation coefficient and Young's modulus of the films obtained were measured. Further, these films were wrapped around drums for the formation of tires, then carcasses, sides, belts, treads, and other tire members were laid on top and the assemblies inflated to form green tires. The green tires were caused to vulcanize by a vulcanizer at a pressure of 2.3 MPa at 185° C. for 15 minutes to finish them into tires of tire size 165SR13.

On the other hand, as a comparative example, a green tire was formed having an inner liner layer of about 0.5 mm, comprised of an unvulcanized rubber composition consisting of a brominated butyl rubber comprised of the master batch A as a base and having added the vulcanization system shown in Comparative Example 9, on the inner surface of the green tire through tie rubber of a thickness of about 0.7 mm. This was then vulcanized at a pressure of 2.3 MPa at 185° C. for 15 minutes to finish the tire (size 165SR13). The blend of the inner liner layer, the air permeation coefficient, and the Young's modulus are shown in Table VII in the same way as with the examples.

The weights of the inner liners of the pneumatic tires obtained were measured and air leakage tests were performed. The results are shown in Table VII.

TABLE VII

| | Ex. 20 | Ex. 21 | Ex. 22 | Comp. Ex. 9 |
|---|---|---|---|---|
| Polyethylene terephthalate (85) and polypropylene diimide diacid (15) copolymer | 40 | 60 | 60 | — |
| Master batch A | 108.6 | 72.4 | — | 181 |
| Master batch B | — | — | 72 | — |
| ZnO | 1.8 | 1.2 | 0.2 | 3 |
| DM | 0.6 | 0.4 | — | 1 |
| Sulfur | 0.3 | 0.2 | — | 0.6 |
| Stearic acid | — | — | 0.8 | — |
| Zinc stearate | — | — | 0.4 | — |
| Air permeation coefficient × $10^{-12}$ (cc · cm/cm² · s · cmHg) (at 30° C.) | 16.2 | 7.6 | 7.2 | 58.2 |
| Young modulus (MPa) | 88 | 141 | 148 | 12.2 |
| Rate of decline in internal pressure (%/month) | 2.4 | 1.7 | 1.6 | 2.7 |
| Weight of inner liner (g) | 125 | 125 | 125 | 650 |

As explained above, according to the present invention, it is possible to provide a pneumatic tire having an air permeation prevention layer which enables the retention of air pressure in the tire to be maintained well and the flexibility to be maintained and at the same time the weight of the tire to be reduced.

We claim:

1. A pneumatic tire having an air permeation prevention layer therein, said layer comprising a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/ polyoxyalkylene diimide diacid of 85/15 or less.

2. A pneumatic tire as claimed in claim 1, wherein the ratio of composition by weight of the polybutylene terephthalate and the polyoxyalkylene diimide diacid is 45/55 to 85/15.

3. A pneumatic tire as claimed in claim 1, wherein the air permeation coefficient of the thin film of the resin composition is 25×10⁻¹² cc•cm/cm²•s•cmHg (at 30° C.) or less and the Young's modulus is 1 to 500 MPa.

4. A pneumatic tire having an air permeation prevention layer therein, said layer comprising a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/ polyoxyalkylene diimide diacid of 90/10 or less, wherein rubber particles are further dispersed in said thermoplastic polyester elastomer, the amount of the rubber particles being 75% by weight or less of the total resin composition.

5. A pneumatic tire as claimed in claim 4, wherein said rubber particles are at least one rubber selected from the group consisting of diene rubbers and their hydrogenates, olefin rubbers, halogen-containing rubbers, silicone rubbers, sulfur-containing rubbers, fluororubbers, and thermoplastic elastomers.

6. A pneumatic tire as claimed in claim 4, wherein the air permeation coefficient of the thin film of the resin composition is $25 \times 10^{-12}$ cc·cm/cm²·s·cmHg (at 30° C.) or less and the Young's modulus is 1 to 500 MPa.

7. The pneumatic tire of claim 4, wherein the amount of the rubber particles is from 10 to 75% by weight of the total resin composition.

8. The pneumatic tire of claim 7, wherein the amount of the rubber particles is from 10 to 50% by weight of the total resin composition.

9. The pneumatic tire of claim 4, wherein the average particle size of the rubber particles dispersed in the thermoplastic polyester elastomer is from 0.5 to 20 μm.

10. The pneumatic tire of claim 9, wherein the average particle size is from 1 to 10 μm.

* * * * *